United States Patent [19]

Trikha

[11] Patent Number: 4,846,421
[45] Date of Patent: * Jul. 11, 1989

[54] ADAPTIVE CONTROL SYSTEM FOR CREW ESCAPE DEVICES

[75] Inventor: Arun K. Trikha, Bellevue, Wash.

[73] Assignee: The Boeing Company, Seattle, Wash.

[*] Notice: The portion of the term of this patent subsequent to Jan. 26, 2005 has been disclaimed.

[21] Appl. No.: 877,220

[22] Filed: Jun. 23, 1986

[51] Int. Cl.⁴ .............................................. B64D 25/10
[52] U.S. Cl. .................... 244/122 AE; 244/122 AB; 244/141; 364/566; 364/426.01
[58] Field of Search ..... 244/122 R, 122 AB, 122 AC, 244/122 AP, 122 AE, 122 AF, 122 AG, 122 AH, 127, 141; 364/423, 424, 426, 566

[56] References Cited

U.S. PATENT DOCUMENTS

| | | | |
|---|---|---|---|
| 3,979,089 | 9/1976 | Miller et al. | 244/122 AD |
| 4,216,928 | 8/1980 | Hooper et al. | 244/122 AD |
| 4,236,687 | 12/1980 | Stone et al. | 244/122 AD |
| 4,303,212 | 12/1981 | Stone et al. | 244/122 AD |
| 4,395,001 | 7/1983 | Stone et al. | 244/122 AE |
| 4,396,171 | 8/1983 | Schultz | 244/122 AD |
| 4,527,758 | 7/1985 | Ayoub et al. | 244/150 |
| 4,673,147 | 6/1987 | Solomonides | 244/122 AE |
| 4,706,909 | 11/1987 | Cuevas et al. | 244/122 AE |
| 4,721,273 | 1/1988 | Trikha | 244/122 AE |

Primary Examiner—Salvatore Cangialosi
Attorney, Agent, or Firm—Bruce A. Kaser

[57] ABSTRACT

An escape device such as an ejection seat system (10) has a propulsion system (42) that accelerates and changes the angular orientation of the device. The system (10) includes sensors (54) for determining certain parameters associated with device altitude, attitude, and sink rate. A microprocessor (36), operatively connected to both the sensors (54) and the propulsion system (42), operates the propulsion system so that the device will move at desired acceleration levels and turn to a desired attitude.

6 Claims, 10 Drawing Sheets

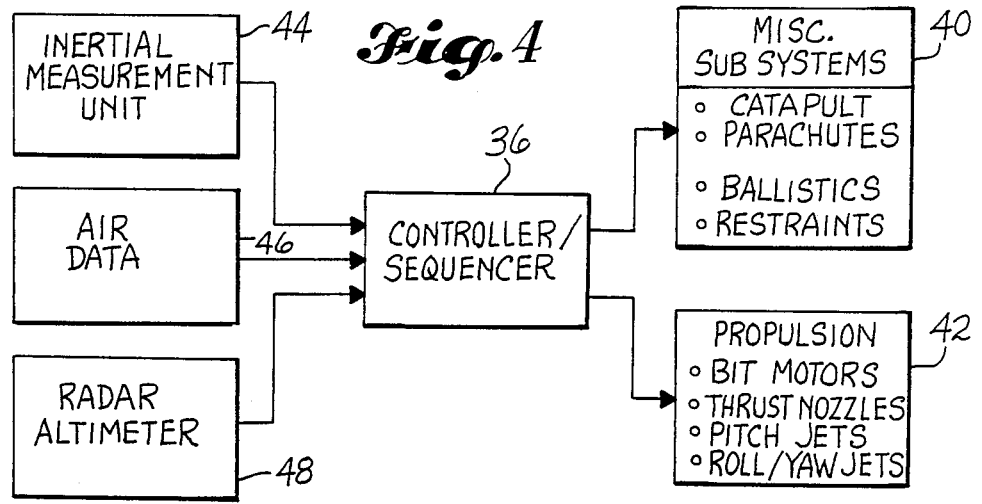
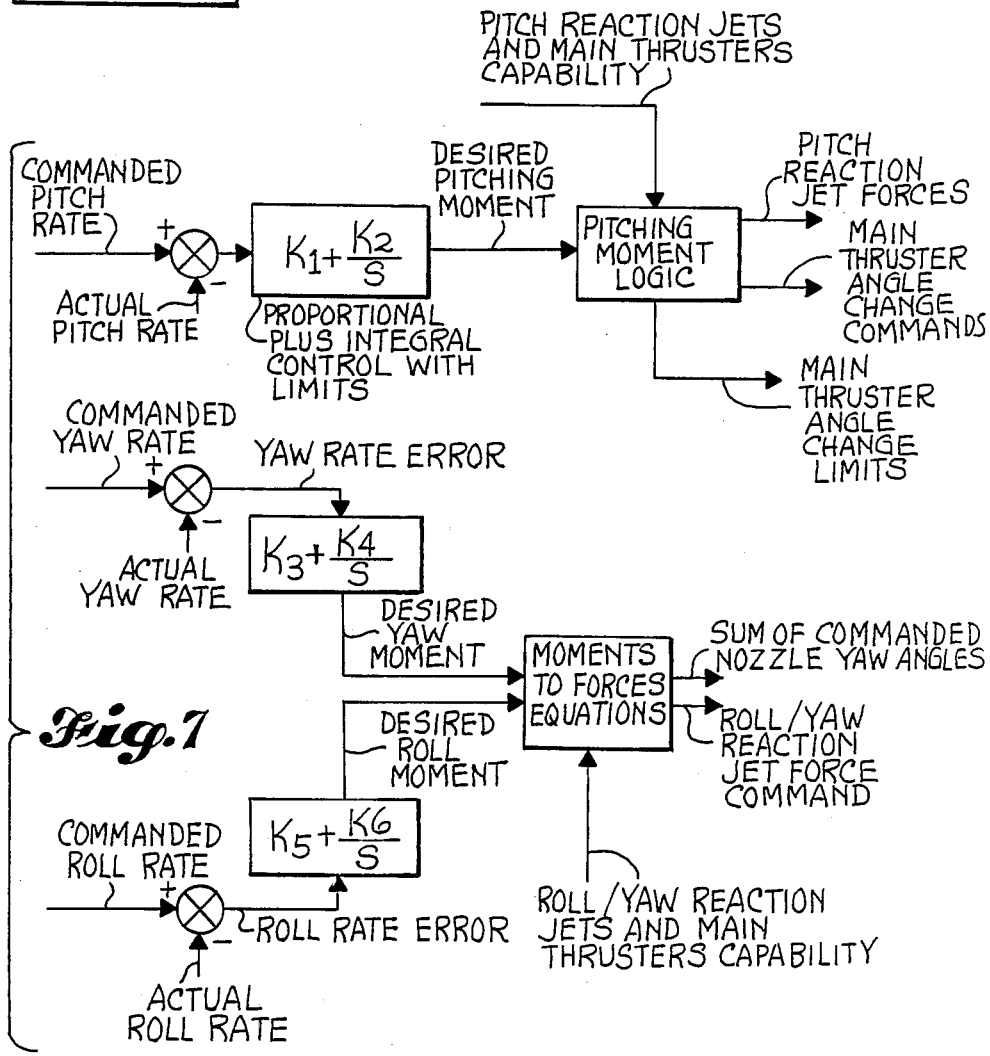

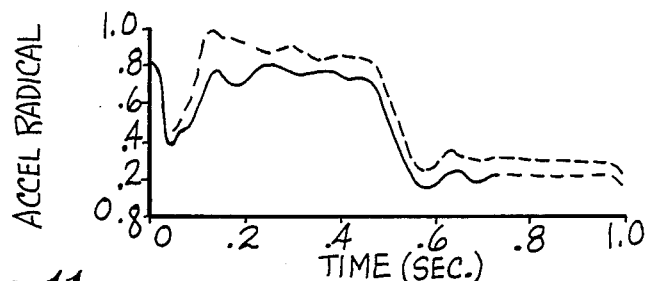
Fig. 11 ACCELERATION RADICAL VERSUS TIME
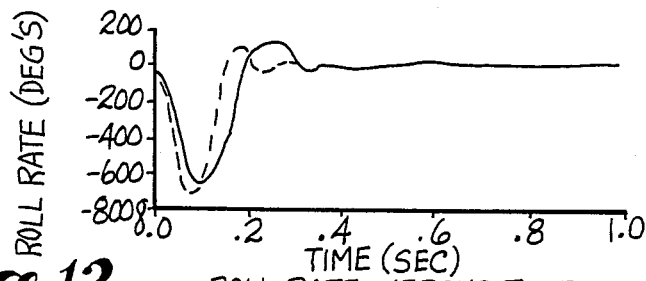
Fig. 12 ROLL RATE VERSUS TIME
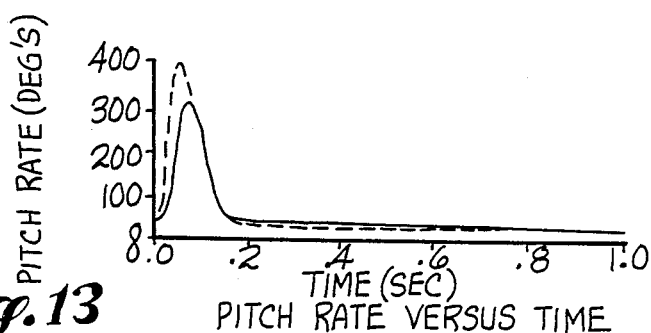
Fig. 13 PITCH RATE VERSUS TIME
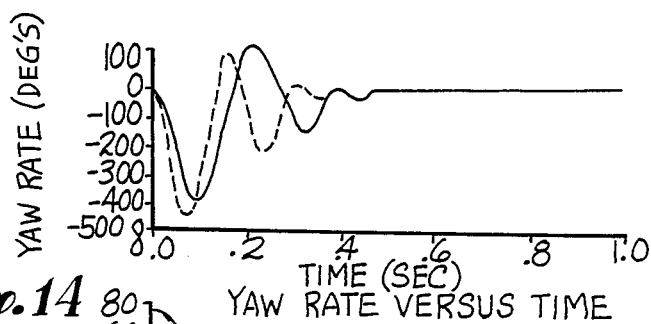
Fig. 14 YAW RATE VERSUS TIME
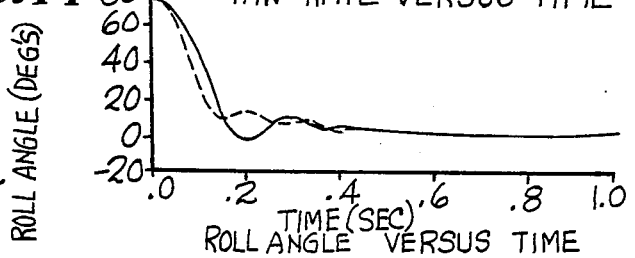
Fig. 15 ROLL ANGLE VERSUS TIME

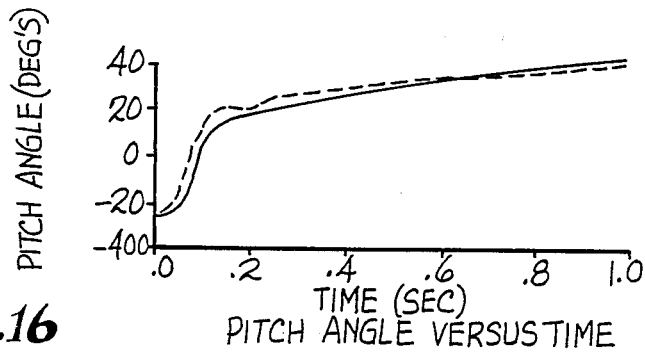
Fig. 16 PITCH ANGLE VERSUS TIME
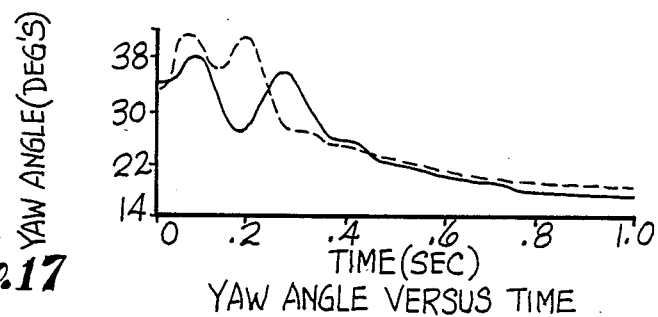
Fig. 17 YAW ANGLE VERSUS TIME
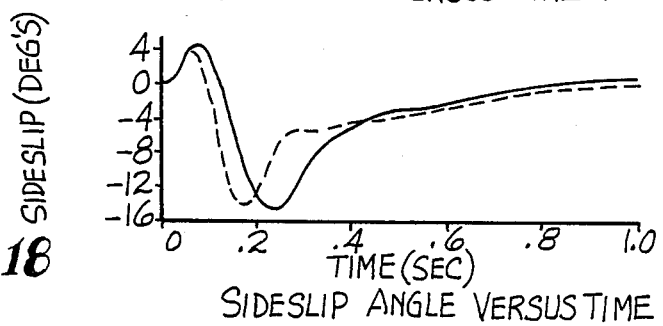
Fig. 18 SIDESLIP ANGLE VERSUS TIME
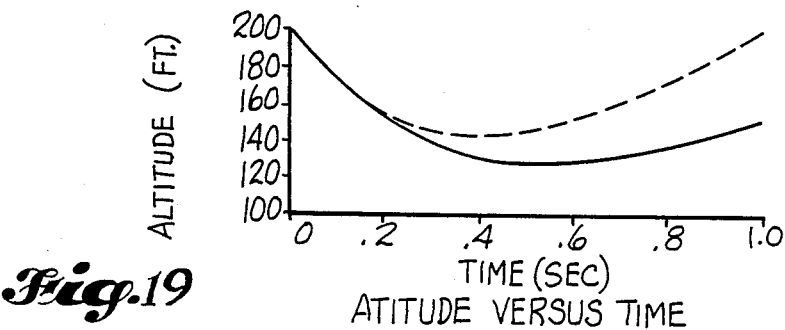
Fig. 19 ATITUDE VERSUS TIME

ADAPTIVE CONTROL SYSTEM FOR CREW ESCAPE DEVICES

The U.S. government has rights in this invention pursuant to Contract No. F33615-84-C-0518 awarded to The Boeing Military Airplane Company of the U.S. Air Force.

TECHNICAL FIELD

This invention relates to ejection seats, escape capsules and other crew escape devices of a similar nature. More particularly, the invention relates to systems which control the movement and orientation of such a device after ejection or escape from a craft which carries the device.

BACKGROUND ART

Certain very stringent performance requirements must be imposed on a crew escape device such as an ejection seat system, for example, to insure the device will operate successfully when ejecting a pilot or crew member from the craft which carries the device. These requirements become particularly stringent in certain kinds of ejection situations where the craft is sinking, and where the craft is already at a low altitude above the ground and/or the craft is in a nonoptimal orientation for ejection. For example, a situation of this kind is ejection from an airplane when the airplane is flying upside down and sinking at a very low altitude.

To safely eject in this type of situation, the escape device must meet the following key performance requirements: First, during ejection it is important the device shall not hit any structural part of the craft which carries the device, such as an airplane's vertical tail section, for example. Second, the altitude required to permit the device to be catapulted or separated from the craft, and to permit the device's propulsion system to re-orient the device, and to gain altitude as may be necessary so that a recovery parachute can be deployed and a successful ejection made, must be minimized. In this regard, for immediate life threatening situations, the altitude required must be minimized by maximizing vertical acceleration and attitude rates within the constraints of allowable acceleration and attitude rates which can be sustained by a pilot or crew member without serious injury. On the other hand, if minimum altitude required for safe ejection is unimportant, as in a high altitude ejection, for example, then acceleration and attitude rates can and should be minimized to keep the probability of pilot or crew member injury low.

Lastly, and in keeping with the desire to control acceleration and attitude rate limits, it is also important to stabilize the device. This means stabilization in all of three possible axes of direction, and includes control to within a desired range of both the device's side slip angle and angle of attack relative to the wind. This last requirement becomes especially important at high speed conditions for those escape devices which are in the form of open ejection seats where the effectiveness of pilot or crew member wind-blast protection devices, which are normally connected to such seats, depends heavily on wind orientation.

The capabilities of current escape devices have not kept pace with the expanding performance envelopes of certain kinds of craft. For example, current and future high performance aircraft have evolved to the point where the criteria they impose for safe ejection have exceeded the capabilities of current state of the art escape devices. For such aircraft, current escape devices provide inadequate stability, fixed performance levels, and no provisions for trajectory modification after ejection, and therefore cannot adjust for certain conditions which prevail at the time ejection is initiated. The invention disclosed herein meets these inadequacies and is particularly adaptable for use in connection with the needs of high performance aircraft, spacecraft or aerospace planes.

DISCLOSURE OF THE INVENTION

The present invention provides an improved control system for an escape device that is usable for escaping or ejecting from various types of craft. The present invention may be used in connection with an ejection seat, escape capsule, or other form of crew escape device which holds a pilot or crew member during an ejection situation. The escape device includes a propulsion system which is operable by the invention to control the trajectory and attitude of the device after ejection.

The control system in accordance with the invention includes both a microprocessor and means for sensing certain data parameters associated with escape device trajectory and attitude. For example, the sensing means sense data parameters which provide device acceleration (preferably close to pilot or crew member's chest location, which is sometimes called the critical point), and device altitude and device attitude rate information. The microprocessor, which is operatively connected to both the propulsion system and the sensing means, adjusts operation of the propulsion system based on these sensed parameters to cause the propulsion system to drive device acceleration and attitude rates in accordance with desired values. Such desired values are selected on the basis of an assessed life threat risk to the pilot or crew member.

The microprocessor, therefore, is programmed to command certain desired acceleration and attitude rates. For example, based on the sensed data parameters, the microprocessor calculates an estimated acceleration of the device which is representative of the device's actual acceleration. The microprocessor then compares the estimated acceleration with the desired acceleration in a particular escape situation, and generates an error if these two values are not substantially the same. In the event of such error, the microprocessor then adjusts the propulsion system. This involves adjusting propulsion system operation so that escape device acceleration is changed an amount related to the value of the error, and further, system operation is also adjusted so that device acceleration is changed an amount related to the past values of the error, the latter occuring over a period of time during which the estimated acceleration does not match the desired acceleration.

In the present invention, acceleration is grossly controlled by adjustment of propulsive thrust magnitude. For example, if solid propellants are used in the propulsion system, then propulsive thrust is grossly controlled by selecting a certain number of solid propellant bit motors to be ignited for providing thrust via thruster nozzles that are gimbal-mounted to the escape device. If liquid or gelled propellants are used, then the thrust is controlled by varying the combustion rates of the propellants. Finer control of acceleration is accomplished by slewing the angles of the thruster nozzles, but within certain limits as defined by the maximum angles of the thrusters can be pivoted.

The invention also accomplishes control of attitude rates, or escape device orientation, generally in similar fashion to the control of acceleration. Specifically, the microprocessor is programmed to command a desired post-ejection angular orientation of the escape device with respect to the earth and the apparent wind direction. Based on the data parameters provided by the sensing means, the microprocessor estimates the device's actual angular orientation, including actual angular rates. The actual orientation is compared with the desired orientation. When they are not the same, or when they are the same but the actual angular rates will cause them to differ with time, the microprocessor calculates desired angular rates which would cause the device to move into the desired orientation. The desired angular rates are compared with the device's actual angular rates, and when they are not the same, an angular rate error is generated. The microprocessor then adjusts the propulsion system to cause the actual angular rates to match the desired angular rates. Thus, escape device stability is provided by driving pitch, roll and yaw rates to zero (or other desired values) by appropriate control of propulsive moments caused to act on the escape device by means of the microprocessor's control of propulsion system operation.

An advantage of the present invention, therefore, is that it provides a means for modifying the trajectory of an escape device after ejection or separation from a craft.

Another advantage of the present invention is that it provides the capability of achieving desired escape device attitude and stability in all three axes of direction after ejection or separation.

Another advantage of the present invention, in conjunction with the above two advantages, is that it provides the capability of controlling acceleration and attitude rates so that they will not exceed limits which are sustainable by a pilot or crew member.

Still another advantage of the present invention is that it works well with not only liquid and gelled propellants, but also with solid propellants that have limited thrust modulation capability. For propulsion systems that use solid propellants, main thruster nozzles and limited-thrust reaction jets, the invention uses reaction jets to their maximum capability and utilizes main thruster nozzles to help the reaction jets in stabilizing the escape device only when the reaction jets cannot accomplish this task alone.

BRIEF DESCRIPTION OF THE DRAWINGS

In the drawings, which illustrate the invention as applied to an aircraft ejection seat having a solid propellant propulsion system, like reference numerals refer to like parts throughout the various views, and wherein:

FIG. 4 is a schematic block diagram of the components of an ejection seat system which may be used in connection with practicing the present invention;

FIG. 7 is a schematic block diagram showing preferred control logic for an inner loop controller portion of the invention, which controls attitude of an ejection seat;

FIG. 11 is a plot showing the invention's control of ejection seat acceleration versus time, wherein the dashed and solid lines indicate, respectively, first and ninety-ninth percentile crew members ejected from an F-16 aircraft cockpit for the following flight conditions: 300 KEAS (knots equivalent air speed), 30° dive angle, 90° roll angle, and 70° Fahrenheit propellant temperature;

FIG. 12 is a plot like FIG. 11, but shows the invention's control of ejection seat roll rate versus time;

FIG. 13 is a plot like FIGS. 11-12, but shows the invention's control of ejection seat pitch rate versus time;

FIG. 14 is a plot like FIGS. 11-13, but shows the invention's control of ejection seat yaw rate versus time;

FIG. 15 is a plot like FIGS. 11-14, but shows the invention's control of ejection seat roll angle versus time;

FIG. 16 is a plot like FIGS. 11-15, but shows the invention's control of ejection seat pitch angle versus time;

FIG. 17 is a plot like FIGS. 11-16, but shows the invention's control of ejection seat yaw angle versus time;

FIG. 18 is a plot like FIGS. 11-17, but shows the invention's control of ejection seat side slip angle versus time; and FIG. 19 is a plot like FIGS. 11-18, but shows the invention's control of ejection seat altitude versus time.

BEST MODE FOR CARRYING OUT THE INVENTION

I. INTRODUCTION

Figure 1:
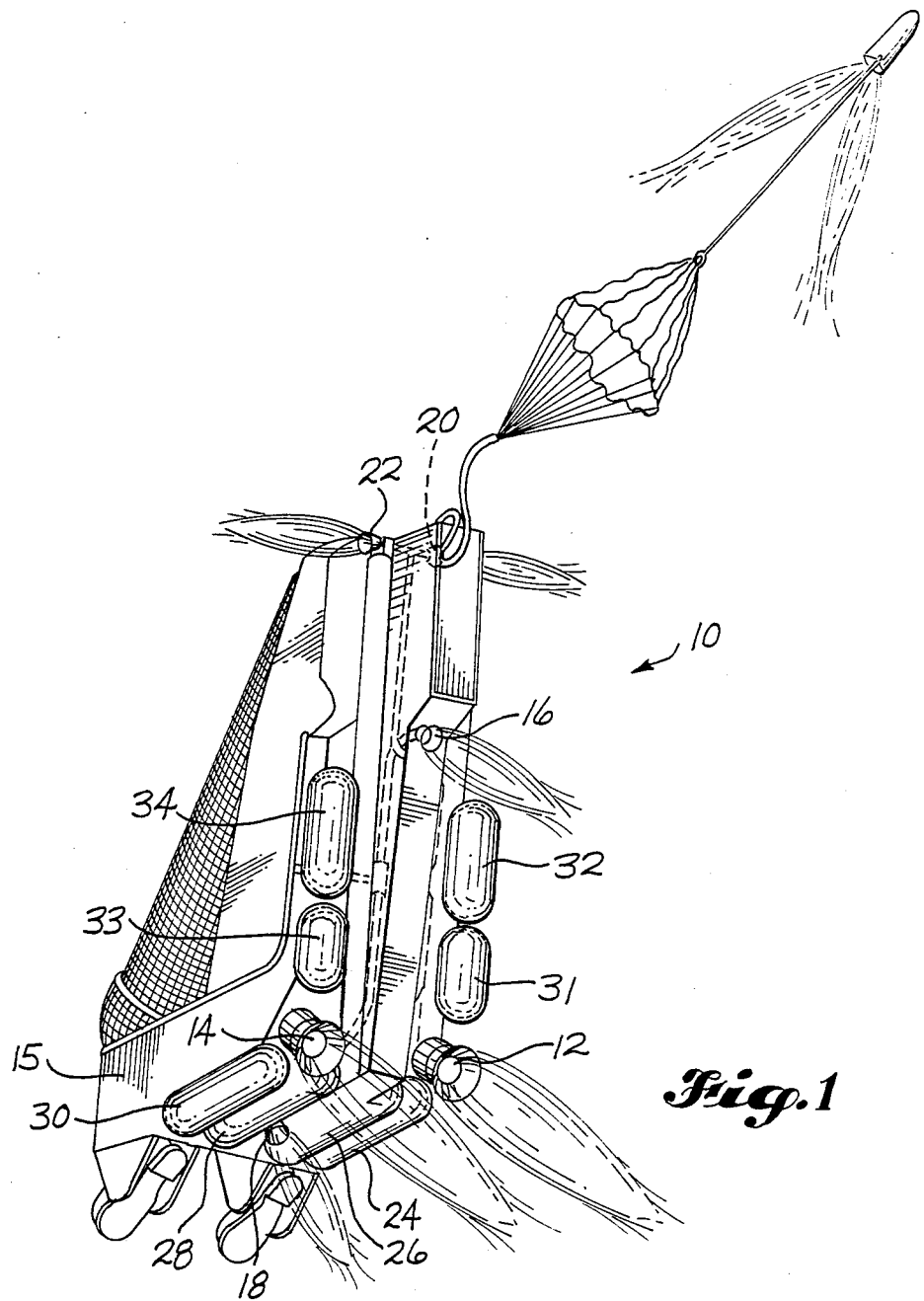
FIG. 1 is a pictorial view of an ejection seat and propulsion system which may be used in connection with the present invention.

Referring now to the drawings, and first to FIG. 1, therein is shown a particular kind of ejection seat system 10 which, for illustrative purposes only, may be employed in connection with the present invention. The system 10 is typical in construction and would be familiar to a person skilled in the art. Briefly, the ejection seat system 10 has a propulsion system that includes a pair of thrusters 12, 14 with omni-axial thrust vectoring capabilities for controlling the trajectory and attitude of the system's seat 15. In addition, the propulsion system also includes a pair of pitch control reaction jets 16, 18, and a pair of yaw/roll reaction jets 20, 22. Propulsive force to the two thrusters 12, 14 and to the pitch, yaw and roll reaction jets 16, 18, 20, 22 is provided by a plurality of solid propellant bit motors 24, 26, 28, 30, 31, 32, 33, 34. The hardware associated with connecting the bit motors 24, 26, 28, 30, 31, 32, 33, 34 to the various reaction jets 16, 18, 20, 22 and thrusters 12, 14, and for controlling the thrust outputs thereof, would be familiar to a person skilled in the art and will not be further described herein. Hereafter, for the purpose of explanation, when general reference is made to a propulsion system, what is meant is the reaction jets 16, 18, 20, 22 and the two omni-axial thrusters 12, 14, and the control thereof.

Referring now to FIG. 4, the propulsion system is controlled by a controller/sequencer 36, which is in the form of a suitable microprocessor mounted somewhere aboard the ejection seat 15. For example, the dashed lines 38 in FIG. 1 show a suitable seat location for the controller/sequencer 36. The controller/sequencer 36 may control other subsystems such as a catapult, parachutes, ballistics, restraints, etc., as indicated at 40, in addition to controlling the previously described propulsion system which is generally indicated at 42. Control of the propulsion and other subsystems 40, 42 is based on inputs from an inertial measurement unit 44, air data sensors 46, and a radar altimeter 48. All of the components 40, 42, 44, 46, 48 shown in FIG. 5 would be familiar to a person skilled in the art. Operation and control of the other subsystems 40 is independent of the propulsion system 42 and will not be described further herein.

In order for the controller/sequencer 36 to properly control the propulsion system 42, the controller/sequencer 36 must have certain input information or data. As was described above, the purpose of the present invention is to control the movement and orientation of an escape device such as the seat 15. In order to accomplish this purpose, the controller/sequencer 36 must have information or data relating to the seat's altitude, speed and attitude. Specific things which must be either sensed or known, for example, are as follows: (a) seat acceleration in three axes; (b) seat angular rates in three axes; (c) seat attitude or orientation in the pitch and roll orientation; (d) seat sink rate, i.e. the rate at which the seat approaches the ground; (e) seat altitude above the ground; (f) seat angle of attack and side slip angle; and (g) dynamic and static air pressure. All of these input parameters or conditions are sensed directly or indirectly by either the inertial measurement unit 44, the air data sensors 46, or the radar altimeter 48. As suggested previously, the operation and function of these components would be familiar to a person skilled in the art. However, a discussion of each, including how each may provide the above-described information for the controller/sequencer 36, is discussed in a published paper entitled "Sensor Selection for the Boeing CREST Ejection Seat Design" which was presented by myself, at the 23rd Annual SAFE symposium in Las Vegas, Nev., on Dec. 4, 1985.

The means by which the controller/sequencer or microprocessor 36 operates the propulsion system 42 is, in preferred form, embodied in a software control program stored in the controller/sequencer 36. The software requirements or control logic for such program are set forth below as applied to the ejection seat system 10.

II. SYSTEM AND SOFTWARE REQUIREMENTS

Figure 3:
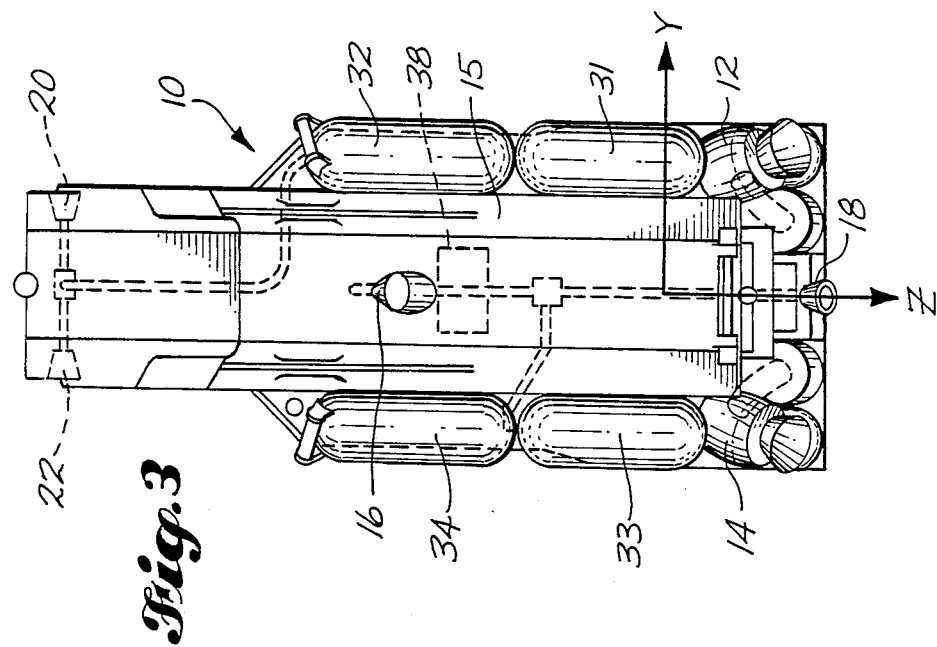
FIG. 3 is a rear elevational view of the ejection seat shown in FIG. 2.
Figure 2:
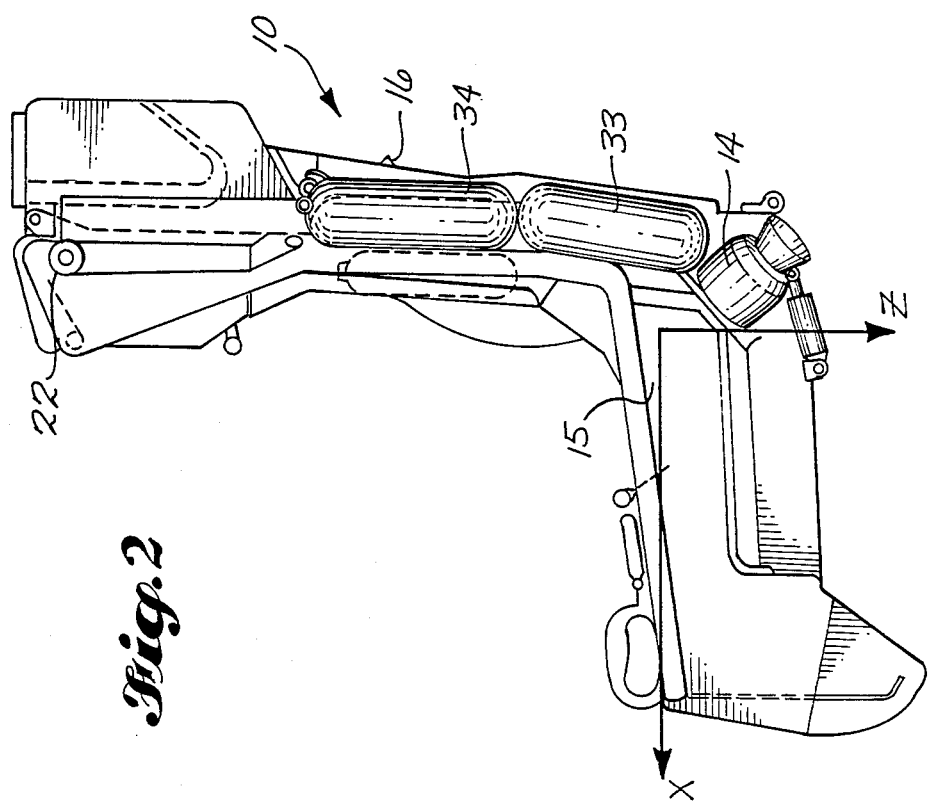
FIG. 2 is a side elevational view of the ejection seat shown in FIG. 1.
Figure 5:
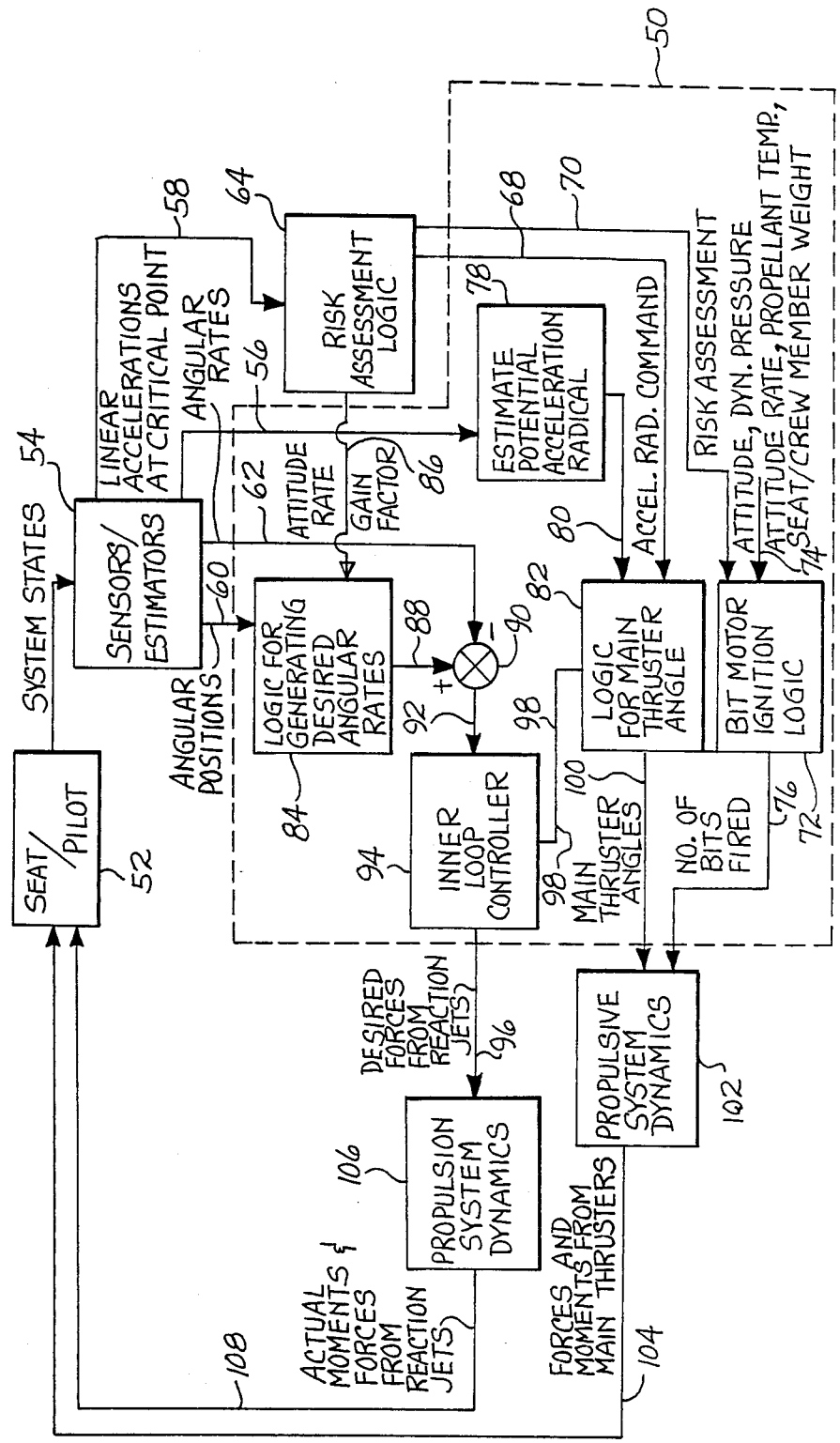
FIG. 5 is a schematic block diagram of preferred ejection seat system control logic in accordance with the present invention, for controlling an ejection seat and propulsion system.

FIG. 5 is a schematic block diagram of preferred control logic in accordance with this invention, for controlling the ejection seat system 10 shown in FIGS. 1-3. Various logic blocks indicated by dashed lines 50 are shown in greater detail in FIGS. 6-10. Since the control logic is adapted, preferably, for the seat system 10 shown in FIGS. 1-3, it is assumed the control logic is adapted for controlling the pitch reaction jets 16, 18, roll and yaw reaction jets 20, 22 and the two main thrusters 12, 14 shown in these Figs.

In FIG. 5, the ejection seat 15 is schematically indicated at 52. Sensors 54 detect the various above-described system states associated with seat altitude, acceleration, and attitude. These sensors 54 may, for example, correspond to the inertial measurement unit 44, air data sensors 46, and radar altimeter 48 shown in FIG. 4. The sensors 54 output the actual linear accelerations of the seat 15 as shown at 56. The sensors 54 also output information relating to seat altitude, sink rate and attitude as indicated at 58. Angular positions and angular rates are output from the sensors 54 as indicated at 60 and 62.

Risk assessment logic 64 utilizes output from the sensors 54 relating to seat altitude, sink rate and attitude, as shown at 58, to produce a desired acceleration command for the seat 15. The acceleration command is based on the life threat risk to the pilot or crew member and is assessed on the basis of the parameters output at 58. The actual logic for producing a commanded acceleration based on risk assessment is the subject matter of another patent application.

Both desired and actual acceleration values are considered in terms of acceleration radicals which are directly related to acceleration. The equation for the acceleration radical for actual acceleration is set forth below:

$$a_{rad} = \left[\left(\frac{a_x}{a_{x,lim}}\right)^2 + \left(\frac{a_y}{a_{y,lim}}\right)^2 + \left(\frac{a_z}{a_{z,lim}}\right)^2\right]$$

wherein $a_x$, $a_y$, and $a_z$ are measured actual linear accelerations as provided by the sensors 54 in each directional axis; and $a_{x,lim}$, $a_{y,lim}$, and $a_{z,lim}$ are the limits of acceleration in each axis that can be sustained by a pilot or crew member. By way of example, the directional axes x, y, and z for the seat 15 are shown in FIG. 2.

In preferred form, the risk assessment logic 64 will command a desired acceleration radical in a range from 0.5 to 0.95, with the lower and upper ends of the range representing low and high risks, respectively. In some situations, this range may be modified by a factor of 60% depending on the seat attitude. In effect, this means the commanded acceleration radical may range from 0.3 to 0.95. The highest acceleration radical is commanded when it is necessary to minimize the survival altitude required for safe ejection from the aircraft. When survival altitude is not a factor, e.g. in high altitude ejection situations, then the lowest acceleration radical is commanded. The acceleration radical command is output from the risk assessment logic as shown at 68.

The risk assessment output (desired acceleration radical) at 70 is received by bit motor ignition logic 72. The ignition logic 72 utilizes this output 70 in combination with the seat's altitude, attitude and angular rates, dynamic pressure, propellant temperature and seat/crew member weight as shown at 74 (such information also being provided by the sensors 54), to determine the number and order of bit motors 24, 26, 28, 30, 31, 33

(manifolded to thrusters 12, 14) which will be fired, as indicated at 76. By firing 1, 2, 3 or 4 of the bit motors simultaneously the thrust of the thrusters 12, 14 can be selected at approximately 25, 50, 75 or 100% of maximum, respectfully. The bit motors 32 and 34 are connected to the reaction jets 16, 18, 20, 22 and are always fired.

The linear acceleration output 56 from the sensors 54 is used by logic 78 to calculate or estimate the actual acceleration radical pursuant to the above equation. The estimated acceleration radical is output as shown at 80 and is received by control logic 82 which adjusts the angles of the main thrusters 12, 14 in response thereto.

The attitude or angular positions output 60 of the sensors 54 is received by control logic 84 which generates desired angular rates for the seat 15. The risk assessment logic 64 also outputs an attitude rate gain factor 86 which causes the change in seat attitude or angular rates to be low or high depending on the assessed life threat risk, in much the same manner as the variation in commanded acceleration radical. The desired angular rates needed to correct seat attitude are output at 88. These desired rates are compared at 90 with the actual angular rates output at 62 from the sensors 54 and, based on their difference, as indicated at 92, inner loop control logic 94 outputs desired moment force commands for the various reaction jets 16, 18, 20, 22 as shown at 96. This commands appropriate corrective forces and moments from the reaction jets as indicated at 106 and 108, respectively. Further, the inner loop control logic 94 outputs main thruster angle commands as shown at 98 to slew thruster nozzle angles as may be necessary for the purpose of aiding the corrective forces and moments provided by the reaction jets. However, this is done only if the reaction jets cannot provide adequate propulsive moments by themselves.

The control logic 82 for the main thruster angles outputs control signals which change main thruster angles for each thruster 12, 14, as shown at 100, in accordance with the inputs 68, 80, 98 received by this logic. The commanded thruster angles 100, and the commanded number of bits to be fired 76, are implemented as shown at 102 to produce desired forces and moments from the thrusters 12, 14. These forces and moments operate on the seat 52 as schematically indicated at 104.

Figure 6:
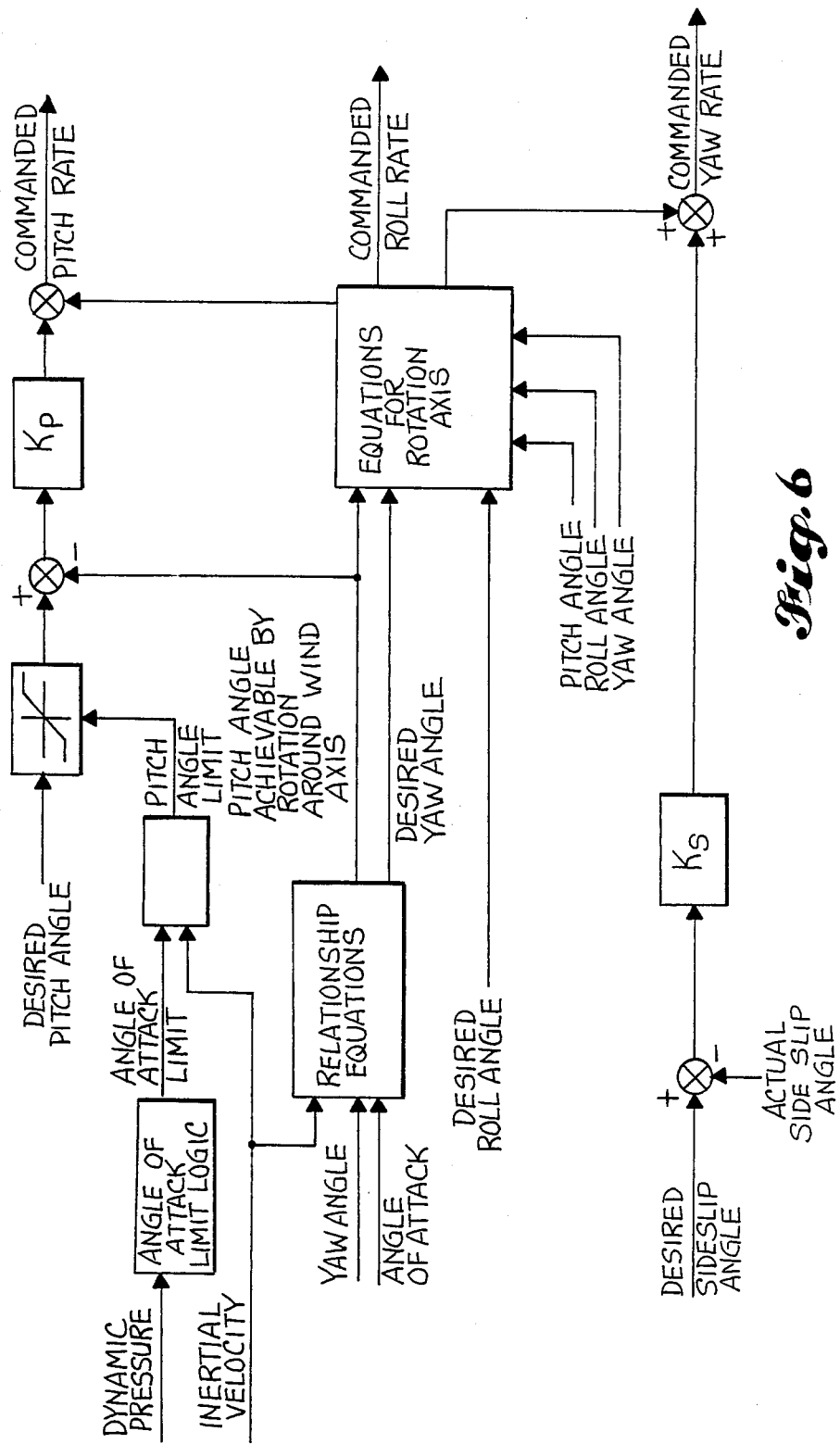
FIG. 6 is a schematic block diagram showing preferred control logic in accordance with the invention for generating commanded angular rates of an ejection seat.
Figure 8:
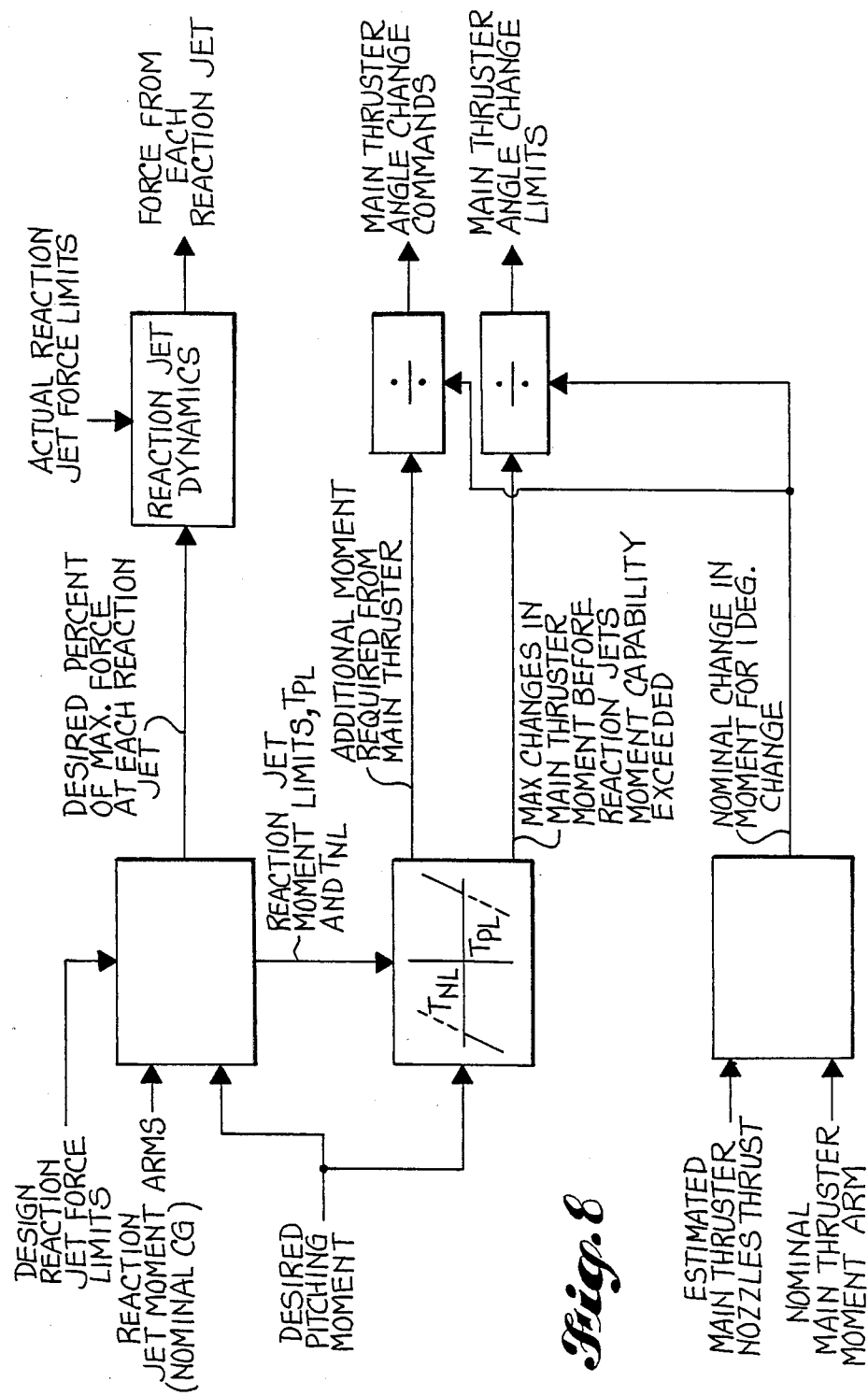
FIG. 8 is a schematic block diagram showing preferred pitching moment control logic for an ejection seat.
Figure 9:
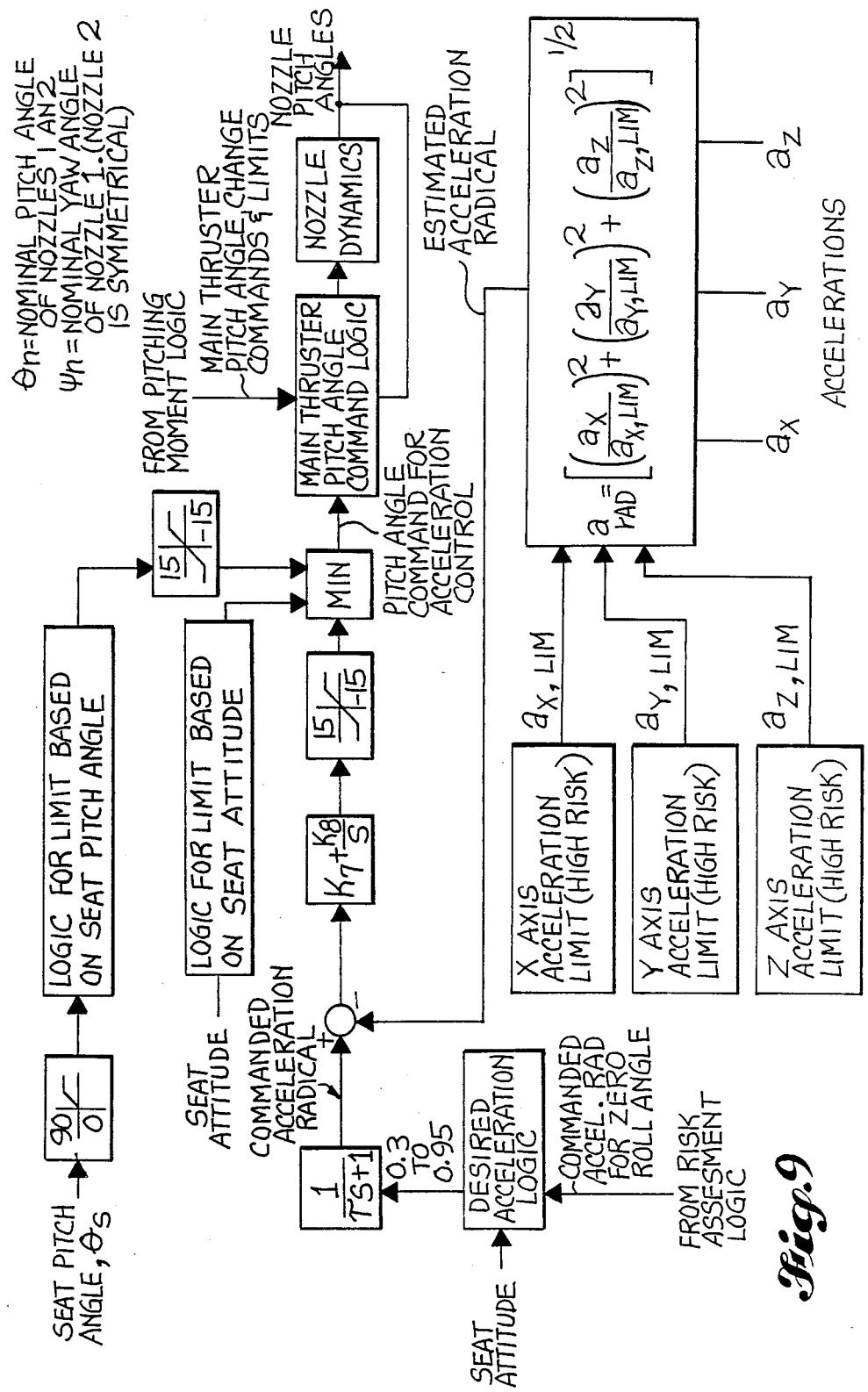
FIG. 9 is a schematic block diagram showing preferred control logic for commanding main thruster nozzle pitch angles for an ejection seat.
Figure 10:
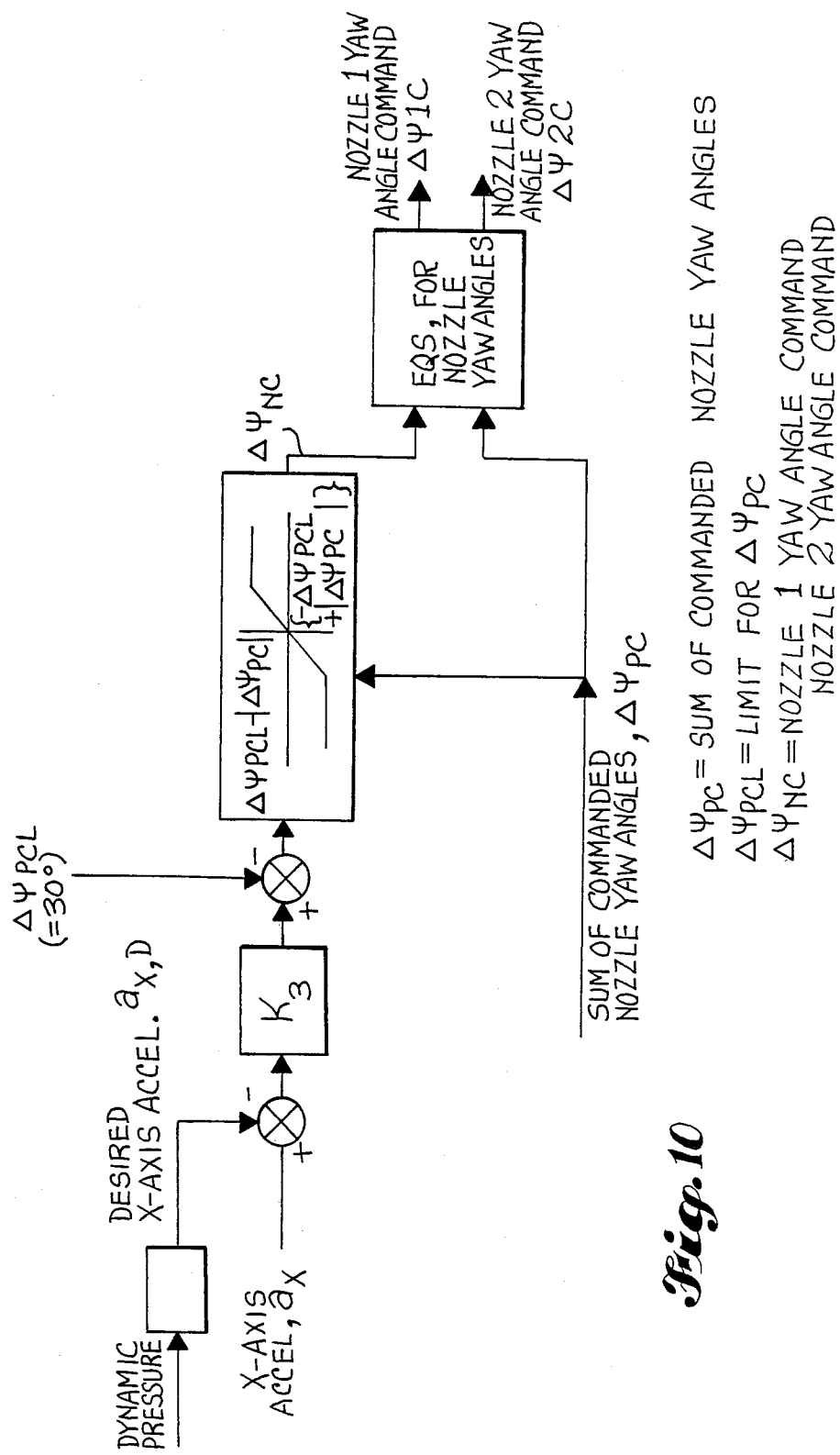
FIG. 10 is a schematic block diagram showing preferred control logic for commanding main thruster nozzle yaw angles for an ejection seat.

As was mentioned above, the various logic blocks shown in FIG. 5, as indicated at 50, are illustrated in greater detail in FIGS. 6-10. FIG. 6 illustrates the preferred logic for generating desired or commanded angular rates which makes up logic block 84 in FIG. 5. FIG. 7 shows the preferred logic for seat attitude control as provided by the inner loop controller block 94 in FIG. 5. FIG. 8 further illustrates the preferred pitching moment logic for the main thrusters as provided by the inner loop controller 94. This was schematically indicated at 98 in FIG. 5, for example. FIG. 9 illustrates the preferred control logic for commanding main thruster nozzle pitch angles and corresponds to logic block 82 in FIG. 5. In association with this same logic block, FIG. 10 illustrates preferred control logic for commanding main thruster nozzle yaw angles. The various data inputs and outputs for the control logic shown in FIGS. 6-10, would be familiar to a person skilled in the art and could be ascertained from the various legends on FIGS. 6-10, and from the corresponding computer program listing which is submitted herewith as part of this specification. Various portions of the listing reference various logic blocks in FIG. 5 and FIGS. 6-10. The program was set up using an EASY5 general purpose program which is described in "Analysis of Ejection Seat Stability Using EASY Program," Vol. 1, AFWAL-TR-80-3014 (United States Air Force Doc. No.), September 1980.

Both acceleration and attitude rates are controlled by making desired propulsive forces and moments appropriate functions of the errors in seat acceleration and attitude rates. The amounts or values of the errors include both proportional plus integral terms that are generally defined by the below equations:

Proportional term $= K_1 \cdot (\text{error})$

Integral term $= K_2 \cdot \int (\text{error}) dt$

The proportional term is used to adjust propulsion system operation in an amount proportional to the amount or value of the error. The integral term is used to adjust propulsion system operation in an amount related to the integration of past values of the error which occur over the period of time during which actual acceleration and attitude rates do not match desired acceleration and attitude rates.

FIGS. 11-19 illustrate the effectiveness of the present invention in controlling trajectory and attitude of the ejection seat system 10. These Figs. show the invention's control of acceleration, attitude and altitude over a period of time for ejection of 99 and 1 percentile crew members from an F-16 cockpit, during the following flight condition: 300 KEAS (knots equivalent air speed), 30° dive angle, 90° roll angle, and 70° Fahrenheit propellant temperature. The results shown in these Figs. illustrate ejection seat behaviour during free flight from the end of a catapult stroke to the end of propulsive control where a drogue chute deploys.

FIG. 11 shows that the maximum values of acceleration radicals are close to 1.0, which would be desired for this type of an ejection situation. The acceleration radical value at time 0.0 was 0.92 due to acceleration experienced during the catapult stroke. Initially, the acceleration radical dropped because a low acceleration radical was commanded by the invention. As the seat rotated to a more upright position, a higher acceleration radical was commanded in order to maximize the upward thrust component and thus minimize the altitude required for survival, which is critical in this type of an ejection situation.

The attitude rate responses shown in FIGS. 12-14 indicate that seat stability was accomplished in all three axes of direction. The angular rates were initially large for a short period of time in order to quickly position the seat for maximizing the thrust component in the vertical direction. However, all rates were well below those attitude rate limits which are known to be safe. These attitude rate limits were 1260, 1260, and 2521 degrees/second for roll, pitch and yaw rates, respectively.

The attitude time histories illustrated in FIGS. 15-17 illustrate that the ejection seat was promptly and smoothly rotated into the desired orientation. For example, a typical desired orientation would be 0° for the roll angle (FIG. 15), 45° for the pitch angle (FIG. 16), and a yaw angle (FIG. 17) which points the ejection seat into the wind. FIG. 18 shows that the side slip angles were kept low and effectively approached zero in the steady state position due to the direct regulation of side slip error by the control logic. FIG. 19 illustrates the vertical trajectory of the ejection seat after separation from the aircraft. Including 37 feet of altitude loss during catapult stroke, the altitudes required for survival were approximately 60 plus 37 ft. or a total of 97 ft. for the first percentile crew member, and 74 plus 37 ft. or a total of 111 ft. for the 99th percentile crew member.

Thus, a preferred embodiment for carrying out the invention has been presented above. It is to be appreciated that the present invention as described above could be altered somewhat without departing from the spirit and scope thereof. For the purpose of defining patent rights in the invention, such rights are to be limited not by this description but by the appended claims which follow. A computer program listing consistent with the previously described system and software requirements follows this description prior to the claims.

```
MODEL DESCRIPTION = CREST IDP CONTROLLER MODEL
*****
*****
*  *** ATMOSPHERE ***
*
LOCATION=010      AG
*
*****
*  *** FORT 039--STATE VARIABLE AND TAIL CLEARANCE INITIALIZATION
*
*
LOCATION=039    FORT    INPUTS=FSTSE,SRPSE,*STSE,USTSE
    ADD PARAMETERS=ITCFLG,SRPTZ(3),FPA,VAC,CAT,ZCGN,TH1,THETA
                   EMPC1,EMPC2,EMPC3,EMPC4,QDATE,TSTROKE,THCG,ALCG
                   CBAR,DBAR,ALSRF,THSRP,EMPTAN,SRPRFTZ(3),IFO,FMSHYP
                   ATHETA,XCG,ZCG,RPD,DPR,EV(3),MODNO,THRV(3),SSLP
    ADD VARIABLES=CEIX,CGIZ,EMPANG,EMPX,EMPZ,EMPIX,EMPIZ
                  DIFFX,DIFFZ,DIFF,DEV(3,3),EVIR(3),DVR(3,3),EPIR(3)
                  DER(3,3),ESTIRX(3),CI(3,3),VCATE(3),THR
                  DERINV(3,3),VACE(3),VCATB(3),DERSCRP(3,3)
FORTRAN STATEMENTS
        IF(ICCALC.NE.1) GOTO 60
        /SRPTZ/=/SRPSE/
        IF(MODNO .EQ. 1) THEN
           THR=THRV(1)
        ELSE IF(MODNO .EQ. 2) THEN
           THR=THRV(2)
        ELSE
           THR=THRV(3)
        END IF
        IF(SSLP .EQ. .99999) SSLP=0.0
        IF(ITCFLG.EQ.1) GOTO 50
C
*INITIAL VALUES - NO TAIL CLEARANCE CALCULATIONS MADE
        EPIR(1)=0.
        EPIR(2)=THR*RPD
        EPIR(3)=0.
        DO 46  I=1,3
  46    EVIR(I)=EV(I)*RPD
C
        CALL DIPCOS(CVR,EPIR)
        CALL DIPCOS(DEV,EVIR)
        /DER/=/DVR/*/DEV/
        CALL COSDIP(ESTIRX,DER)
        DO 48  I=1,3
  48    ESTSE(I)=ESTIRX(I)*DPR
C
        VACE(1)=VAC*COSD(FPA)*COSD(SSLP)
        VACE(2)=-VAC*COSD(FPA)*SIND(SSLP)
        VACE(3)=-VAC*SIND(FPA)
        VCATB(1)=0.
        VCATB(2)=0.
        VCATB(3)=-VCAT
C
        /DERSCRP/=/DER/
        /CI/=/I/
        /DERINV/=/DERSCRP/-1/CI/
C
        /USTSE/=/DER/*/VACE/
        /USTSE/=/USTSE/+/VCATB/
C
        /VCATE/=/DERINV/*/VCATB/
        /TMSE/=/VACE/+/VCATE/
C
*TAIL CLEARANCE  CODE INITIALIZATION
C
        XCG=0.
        ZCG=0.
```

```
            ZCGN=0.
            TH1=0.
            THBAR=C.
            THCG=0.
            ALCG=0.
            CBAP=0.
            DBAP=0.
            ALSRP=C.
            THSRP=C.
            EMPHYP=0.
            EMPTAN=0.
            THO=0.
            /SRPPFTZ/=/0/
C
            CGIX=0.
            CGIZ=0.
            EMPANG=0.
            EMPX=0.
            EMPZ=0.
            EMPIX=C.
            EMPIZ=C.
            DIFFX=C.
            DIFFZ=C.
            DIFF=0.
C
            GOTO 60
C
   50    XCG=CCGSE(1)
         ZCG=CCGSE(3)
         ZCGN=-ZCG
         TH1=THR+ATHETA+QRATE*TSTROKE
         THBAR=DPF*ATAN2(EMPC4,EMPC3) + ATHETA
         THCG=THBAR+QRATE*TSTROKE
         ALCG=(EMPC4**2+EMPC3**2)**.5
         CBAP=ALCG*SIND(THCG)-(XCG*SIND(TH1)+ZCGN*COSD(TH1))
         DBAP=ALCG*COSD(THCG)-(XCG*COSD(TH1)-ZCGN*SIND(TH1))
         ALSRP=(CBAP**2+DBAP**2)**.5
         THSRP=DPF*ATAN2(CBAP,DBAR)
         EMPHYP=(EMPC1**2+EMPC2**2)**.5
         EMPTAN=DPF*ATAN2(EMPC2,EMPC1)
         SRPRFTZ(2)=0.
         IF(TSTROKE.EQ.0.) THEN
            THO=TH1
            SRPRFTZ(1)=-(XCG*COSD(THO)-ZCGN*SIND(THO))
            SRPRFTZ(3)=XCG*SIND(THO)+ZCGN*COSD(THO)
         ELSE
            THO=0.
            SRPRFTZ(1)=ALSRP*COSD(THSRP)-ALCG*COSD(THBAR)
            SRPRFTZ(3)=ALCG*SIND(THBAR)-ALSRP*SIND(THSRP)
         END IF
C
*INITIAL CONDITIONS--WHEN TAIL CLEARANCE IS CALCULATED

WSTSE(1)=0.
         WSTSE(2)=QRATE
         WSTSE(3)=0.
         ESTSE(1)=0.
         ESTSE(2)=TH1
         ESTSE(3)=0.
         TM SE(1)=VAC*COSD(FPA)-VCAT*SIND(TH1)
      $         +RPD*QRATE*ALSRP*SIND(THSRP)
         TM SE(2)=0.
         TM SE(3)=-VAC*SIND(FPA)-VCAT*COSD(TH1)
      $         +RPD*QRATE*ALSRP*COSD(THSRP)
         USTSE(1)=TM SE(1)*COSD(TH1)-TM SE(3)*SIND(TH1)
         USTSE(2)=0.
         USTSE(3)=TM SE(1)*SIND(TH1)+TM SE(3)*COSD(TH1)
C
C   THE FOLLOWING VARIABLES ARE NOT USED WHEN TAIL CLEARANCE
C   IS CALCULATED.  THEREFORE, ESTABLISH REAL DEFAULT VALUES.
C
         /ERIR/=/C/
         /EVIR/=/C/
         /DVR/=/0/
         /CEV/=/0/
```

```
          /CEP/=/0/
          /ESTIPX/=/0/
          /VACE/=/C/
          /VCATB/=/0/
          /DERSCPP/=/0/
          /CI/=/0/
          /DERINV/=/0/
          /VCATE/=/C/
C
   60 CONTINUE
*
*****
* *** SEAT AERODYNAMICS ***
*
LOCATION=005      AS          INPUTS=SE(SPP=SPP,UST=UST,EST=EST,,ST=,ST
*
*****
* *** FORT 070--BIT FIRING LOGIC ***
*
LOCATION=070      FORT        INPUTS=ESTSE
                  ADD VARIABLES=T,TBAR,PH,TH,BITFLG,TMTBAR,FTP
FORTRAN STATEMENTS
       T=TIME
       PH=ESTSE(3)
       TH=ESTSE(2)
       FTP=SIND(TH)+COSD(TH)*COSD(PH)
C
       IF(ICCALC .NE. 1) GOTO 10
         TBAR=0.
         IF(FTP .LT. -.2)THEN
           BITFLG=0.
         ELSE
           BITFLG=1.
         END IF
C
    10 IF(BITFLG .EQ. 1.) THEN
         TMTBAR=T-TBAR
       ELSE IF(FTP .GE. -.2)THEN
         BITFLG=1.
         TBAR=T
         TMTBAR=0.
       ELSE
         TMTBAR=0.
       END IF
*
*****
* *** ROCKET THRUST TABLES ***
*
LOCATION=068      FU2    INPUTS=FOPT(TMTBAR=S)
*
*
LOCATION=079      FU1    INPUTS=FOPT(T=S)
*
*****
* *** FORT 077--CALCULATE PROPULSIVE FORCES AND TORQUES ACTING ON SEAT **
*
LOCATION=077      FOPT        INPUTS=S2 LA1,S2 LA2,S2 FU1,S2 FU2,BITFLG
         ADD PARAMETERS=XNOZ,YNOZ,ZNOZ,PSIN1,PSIN2,THEN1,THEN2
                        TH3,TH4,X3,Z3,X4,Z4
         ADD VARIABLES=FORCE(3),TORQUE(3),T11(3),F11(3)
                       TROCKET,FN,X11N,X12N,X21N,X22N,FXS1,FYS1,FZS1
                       COSTH3,SINTH3,COSTH4,SINTH4,T11A,T11B
                       FXS2,FYS2,FZS2,CPSIN1,CPSIN2,CTHEN1,CTHEN2
                       STHEN1,STHEN2,SPSIN1,SPSIN2,FSORT1,FSORT2
                       XNOZCG,YNOZCG,ZNOZCG
FORTRAN STATEMENTS
*
C    FORCES AND TORQUES DUE TO MAIN ROCKET
*
C
       IF(BITFLG .EQ. 1.) THEN
         TROCKET=S2 FU1+S2 FU2
       ELSE
         TROCKET=S2 FU1
       END IF
```

```
C
      FN=TROCKET/2.
      IF(FN .LT. 1.) FN=1.
C
      IF(ICCALC .NE. 1) GOTO 11
      XNOZCG=XNOZ-XCGD
      YNOZCG=YNOZ
      ZNOZCG=ZNOZ-ZCGD
      CPSIN1=CCSD(PSIN1)
      CPSIN2=CCSD(PSIN2)
      CTHEN1=CCSD(THEN1)
      CTHEN2=CCSD(THEN2)
      SPSIN1=SIND(PSIN1)
      SPSIN2=SIND(PSIN2)
      STHEN1=SIND(THEN1)
      STHEN2=SIND(THEN2)
   11 CONTINUE
C
      X11N=-SIND(S2 LA2(1))
      X21N= SIND(S2 LA2(2))
      X12N=-SIND(S2 LA2(3))
      X22N= SIND(S2 LA2(4))
C
      FSQRT1=SQRT(1.-X11N**2-X21N**2)
      FXS1=(CPSIN1*CTHEN1*FSQRT1+SPSIN1*X11N-CPSIN1*STHEN1*X21N)*FN
      FYS1=(SPSIN1*CTHEN1*FSQRT1-CPSIN1*X11N-SPSIN1*STHEN1*X21N)*FN
      FZS1=(-STHEN1*FSQRT1-CTHEN1*X21N)*FN
C
      FSQRT2=SQRT(1.-X12N**2-X22N**2)
      FXS2=(CPSIN2*CTHEN2*FSQRT2+SPSIN2*X12N-CPSIN2*STHEN2*X22N)*FN
      FYS2=(SPSIN2*CTHEN2*FSQRT2-CPSIN2*X12N-SPSIN2*STHEN2*X22N)*FN
      FZS2=(-STHEN2*FSQRT2-CTHEN2*X22N)*FN
C
      FORCE(1)=FXS1+FXS2
      FORCE(2)=FYS1+FYS2
      FORCE(3)=FZS1+FZS2
      TORQUE(1)=-(FYS1+FYS2)*ZNOZ + (-FZS1+FZS2)*YNOZ
      TORQUE(2)= (FXS1+FXS2)*ZNOZ - ( FZS1+FZS2)*XNOZ
      TORQUE(3)= (FXS1-FXS2)*YNOZ + ( FYS1+FYS2)*XNOZ
C
C FORCES AND TORQUES DUE TO REACTION JETS
C
      IF(ICCALC .NE. 1) GOTO 12
         COSTH3=COSD(TH3)
         SINTH3=SIND(TH3)
         COSTH4=COSD(TH4)
         SINTH4=SIND(TH4)
         T11A=-SQRT(X3**2+Z3**2)*COSD(TH3-ATAN2(-X3,-Z3)*DPR)
         T11B= SQRT(X4**2+Z4**2)*COSD(90.-TH4-ATAN2(Z4,X4)*DPR)
   12 CONTINUE
C
      T11(1)=-Z21*S2 LA1(1)
      T11(2)=T11A*S2 LA1(2)+T11B*S2 LA1(3)
      T11(3)=X21*S2 LA1(1)
      F11(1)=COSTH3*S2 LA1(2)+COSTH4*S2 LA1(3)
      F11(2)=S2 LA1(1)
      F11(3)=-SINTH3*S2 LA1(2)-SINTH4*S2 LA1(3)
*
*****
* *** SEAT ***
*
LOCATION=027    SE         INPUTS=AS(F2,1=F2,1,T2,1=T2,1)
                           FOPT(F11=F1,1,T11=T1,1
                                 FORCE=F1,2,TORQUE=T1,2)
*
*****
* *** AEROMEDICAL ***
*
LOCATION=004    AC         INPUTS=SE(BST=BST,GXA=GXA)
*
*****
* *** TABLE FOR QUATERNION GAIN BASED ON "FTP"
*
LOCATION=023    FU3    INPUTS=FOPT(FTP=S)
```

```
*****
****TABLE FCR PITCH ANGLE GAIN BASED ON "FTF"
*
LOCATION=025     FU4      INPUTS=FORT(FTF=S)
*****
* ** FORT 012 -- CALCULATE CONTROL LAW REFERENCE AND FEEDBACK QUANTITIES
*
LOCATION=012     FORT         INPUTS=ALPAS,BETAS,USTSE,WSTSE,EXASE,PH,TH
                                     RALAC,RANAC,RAHAC,S2 FL3,S2 FL4,Q  AS
            ADD PARAMETERS=PISK,GAIN4,BET1C
                           PITCH,CUTOFF,SLOPE,ZERO,GXD
                           XLIMIT,YLIMIT,ZLIMIT,RADREF1,RADREF2
            ADD VARIABLES=RADICAL,REFCOM(5),.(5),ACRAD,RADREF
                          ESFR(3),DESF(3,3),DESC(3,3),DESCT(3,3)
                          DSCSF(3,3),ANGSCSF(3),CPH2,CTH2,CPS2,SPH2
                          STH2,SPS2,QT(4),ALPHAQ,EAXIS(3),FQ,ESTR(3)
                          USTSEI(3),PITCHM,WINCP,ALFMAX,ALFMIN
            ADD TABLES=TALFMIN,8,1,TALFMAX,8,1
FORTRAN STATEMENTS
*
C     DESIRED ANGULAR RATES AND MOMENTS
C
      DO 14 I=1,3
  14     ESTR(I)=ESTSE(I)*RPD
      CALL DIRCOS(DESC,ESTR)
      /DESCT/=/DESC/T
      /USTSEI/=/DESCT/*/USTSE/
      ESFR(1)=ARTAN2(USTSEI(2),USTSEI(1))
      ESFR(2)=-ARTAN2(USTSEI(3),(USTSEI(1)**2+USTSEI(2)**2)**0.5)
     $        +ALPAS*RPD
      ESFR(3)=0.
C
      CALL DIRCOS(DESF,ESFR)
      /DSCSF/=/DESF/*/DESCT/
      CALL COSDIR(ANGSCSF,DSCSF)
      CPH2=COS(ANGSCSF(3)/2)
      CTH2=COS(ANGSCSF(2)/2)
      CPS2=COS(ANGSCSF(1)/2)
      SPH2=SIN(ANGSCSF(3)/2)
      STH2=SIN(ANGSCSF(2)/2)
      SPS2=SIN(ANGSCSF(1)/2)
      QT(1)=CPH2*CTH2*CPS2+SPH2*STH2*SPS2
      QT(2)=SPH2*CTH2*CPS2-CPH2*STH2*SPS2
      QT(3)=CPH2*STH2*CPS2+SPH2*CTH2*SPS2
      QT(4)=CPH2*CTH2*SPS2-SPH2*STH2*CPS2
      IF(QT(1).GE.0.) GOTO 18
         DO 16  I=1,4
  16        QT(I)=-QT(I)
  18  ALPHAQ=2.*ACOS(QT(1))
C
C  CHECK TO SEE IF ALREADY ALIGNED ALONG WIND AXIS.
C  IF SO, AVOID DIVISION BY ZERO.
C
      IF(ABS(ESTR(1)-ESFR(1)) + ABS(ESTR(2)-ESFR(2)) +
     $   ABS(ESTR(3)-ESFR(3)) .LT. 1.E-03) THEN
         DO 19 I=1,3
  19        EAXIS(I)=0.
         FQ=0.
      ELSE
         DO 20  I=1,3
  20        EAXIS(I)=QT(I+1)/SIN(ALPHAQ/2.)
         FQ=AMIN1(S2 FL3*ALPHAQ*DPR,780.)
      END IF
      DO 23 I=1,3
  23     REFCOM(I)=FQ*EAXIS(I)
C
C
      CALL FU(TALFMIN,ALFMIN,Q  AS,1)
      CALL FU(TALFMAX,ALFMAX,Q  AS,1)
      WINCP=DPR*(-ARTAN2(USTSEI(3),(USTSEI(1)**2+USTSEI(2)**2)**.5))
      PITCHM=AMIN1(ALFMAX+WINDP,AMAX1(ALFMIN+WINDP,PITCH))
C
      REFCOM(2)=S2 FL4*(PITCHM-ESFR(2)*DPR) + REFCOM(2)
      REFCOM(2)=AMIN1(300.,AMAX1(REFCOM(2),-300.))
      REFCOM(3)=REFCOM(3)+GAIN4*(BETAD-BETAS)
```

```
C
C     DESIRED ACCEL. RADICAL ( SEE FORT002 ALSO) AND DESIRED X-AXIS ACCEL.
C
      IF(FTP .LT. 1.)THEN
         RADREF=RADREF1
      ELSE
         RADREF=RADREF2
      END IF
C
      REFCOM(5)=GXC
C
C     ACTUAL ANGULAR RATES (FEEDBACK)
C
      W(1)=WSTSE(1)
      W(2)=WSTSE(2)
      W(3)=WSTSE(3)

C
C     CALCULATE ESTIMATED ACCELERATION RADICAL (FEEDBACK)
C
      IF (RISK .LT. 1.1) THEN
         ACRAD=RALAC
      ELSE IF (RISK .GT. 1.9 .AND. RISK .LT. 2.1) THEN
         ACRAD=RANAC
      ELSE IF (RISK .GT. 2.9) THEN
         ACRAD=RAHAC
      END IF
C
      XLIMIT=46.
      YLIMIT=22.0
      ZLIMIT=22.8
C
      IF (TIME .LT. CUTOFF) THEN
         XLIMIT=XLIMIT*(SLOPE*TIME+ZERO)
         YLIMIT=YLIMIT*(SLOPE*TIME+ZERO)
      END IF
      RADICAL=SQRT((GXASE(1)/XLIMIT)**2+(GXASE(2)/YLIMIT)**2+
     &            (GXASE(3)/ZLIMIT)**2)
      W(4)=RADICAL
      W(5)=GXASE(1)

*TRANSFER FUNCTION FOR RADICAL REFERENCE VALUE

LOCATION=001     LA3       INPUTS=FORT(RADREF=S)

* *** FORT002--FORM THE FEEDBACK ERROR: REFERENCE VALUE-FEEDBACK SIGNAL

LOCATION=002     FORT      INPUTS=S2 LA3,REFCOM,W
      ADD VARIABLES=COMERR(5)
FORTRAN STATEMENTS
      REFCOM(4)=S2 LA3
      DO 35 I=1,5
         COMERR(I)=REFCOM(I)-W(I)

35 CONTINUE

*****
* *** PROPORTIONAL CONTROLLER ***

LOCATION=032     GA    N=5       INPUTS=FORT(REFCOM=REF,W=S)

*****
* *** INTEGRAL CONTROLLER ***

LOCATION=034     IT    N=5       INPUTS=FORT(COMERR=S)

*****
* *** FORT 052-- PROPULSIVE SYSTEM COMMANDS ***

LOCATION=052     FORT      INPUTS=S2 GA,S2 IT,TH,PH,S2 LA2,WSSE,FN
                                  CPSIN1,SPSIN1,XNOZCG,ZNOZCG,COMERR
                                  CPSIN2,STHEN2,CTHEN2
                 ADD PARAMETERS=ROCKMIN,ROCKMAX,PJFMAX,YRJFMAX,FSFNMAX
                                  X21,Z21,XCGD,ZCGD,C1
```

```
 ACD VARIABLES=X21CG,Z21CG,PSIPFN,COMRJ(3),PJ3MA,PJ4MA
               PJMMIN,PJMMAX,DMOMMIN,DMOMMAX,DMOM,DELNC7
               DELNZL,DELNZU,COMN(4),COMMAX,COMMIN
               FICONT(5),TEST,THCA,THPI,THL,PSINC,THN2
              A,B,F,PSIP,THETA,DMDA,PPLIMBP
FORTRAN STATEMENTS
*
* REACTION JET THRUST COMMANDS
*
C
C   MODIFY THE OUTPUT OF THE PROPORTIONAL CONTROLLER IN THE PITCH
C   LOOP: FOR (POSITIVE) PITCH THRUST COMMANDS GREATER THAN 2/3RDS
C   THE MAXIMUM AVAILABLE PITCH JET THRUST, REDUCE THE COMMAND BY
C   AN AMOUNT PROPORTIONAL TO THE AMOUNT BY WHICH THE COMMAND EXCEEDS
C   THE 2/3RDS THRUST LEVEL.  CONVERSELY FOR A NEGATIVE PITCH COMMAND.
C
      PPLIMBP=.67*PJFMAX
      IF(S2 GA(2).LT.-PPLIMBP) S2 GA(2)=-PPLIMBP+.5*(S2 GA(2)+PPLIMBP)
      IF(S2 GA(2).GT.PPLIMBP) S2 GA(2)=PPLIMBP+.5*(S2 GA(2)-PPLIMBP)
C
      DO 38 I=1,5
         PICONT(I)=S2 GA(I)+S2 IT(I)
   38 CONTINUE
C
C   YAW/ROLL REACTION JET COMMAND AND NOZZLE LATERAL COMMANDS FOR
C   YAW/ROLL AND ACCELERATION CONTROL
C
      IF(ICCALC .NE. 1) GOTO 40
         X21CG=X21-XCGD
         Z21CG=Z21-ZCGD
         A=-CPSIN1*ZNOZCG/DPR
         B= (-SPSIN1*YNOZCG+CPSIN1*XNOZCG)/DPR
   40 CONTINUE
C
      COMRJ(1)=(A*PICONT(3)-B*PICONT(1))/(A*X21CG+B*Z21CG)
      PSIPFN=(Z21CG*PICONT(3)+X21CG*PICONT(1))/(A*X21CG+B*Z21CG)
C
      F=AMAX1(ABS(COMRJ(1))/YPJFMAX,ABS(PSIPFN)/PSFNMAX)
      IF(F .LE. 1.) GOTO 41
      COMRJ(1)=COMRJ(1)/F
      PSIPFN=PSIPFN/F
   41 CONTINUE
C
      PSIP=PSIPFN/FN
      IF(PSIP .GT. 30.) PSIP=30.
      IF(PSIP .LT. -30.) PSIP=-30.
C
      PSINC=-PICONT(5)-30.
      IF(PSINC .GT. 30.) PSINC=30.
      IF(PSINC .LT. -30.) PSINC=-30.
C
      PSINC=AMAX1(-30.+ABS(PSIP),AMIN1(PSINC,30.-ABS(PSIP)))
      COMN(1)=(PSIP+PSINC)/2.
      COMN(3)=(PSIP-PSINC)/2.
C
C   COMMANDS FOR PITCH REACTION JETS
C
      PJ3MA=((Z3-ZCGD)**2+(X3-XCGD)**2)**.5
      PJ4MA=((Z4-ZCGD)**2+(X4-XCGD)**2)**.5
      PJMMIN=-PJFMAX*PJ3MA
      PJMMAX=PJFMAX*PJ4MA
      IF(PICONT(2).GT.PJMMAX) THEN
         COMRJ(2)=0.
         COMPJ(3)=PICONT(2)/PJ4MA
      ELSE IF(PICONT(2).LT.PJMMIN) THEN
         COMRJ(2)=-PICONT(2)/PJ3MA
         COMPJ(3)=0.
      ELSE
         COMPJ(3)=(PICONT(2)+PJ3MA*PJFMAX)/(PJ3MA+PJ4MA)
         COMPJ(2)=PJFMAX-COMRJ(3)
      END IF
C
C   NOZZLE LONGITUDINAL COMMANDS FOR ACCELERATION CONTROL AND
C   PITCH STABILITY
      DMOMMIN=PJMMIN
      DMOMMAX=PJMMAX
```

```
      DMOM=0.
      DELNZL=0.
      DELNZL=0.
      DELNOZ=0.
      IF(FN .EQ. 0.) GOTO 42
      IF(PICONT(2).GT.DMOMMAX) DMOM=PICONT(2)-DMOMMAX
      IF(PICONT(2).LT.DMOMMIN) DMOM=PICONT(2)-DMOMMIN
      DMDA=-2.*FN*(ZNOZCG*CFSIN2*STHFN2 - XNOZCG*CTHEN2)/DPR
      DELNOZ=DMOM/DMDA
      DELNOZ=AMAX1(ROCKMIN-ROCKMAX,AMIN1(DELNOZ,ROCKMAX-ROCKMIN))
      DELNZU=(FICONT(2)-DMOMMAX)/DMDA
      DELNZL=(FICONT(2)-DMOMMIN)/DMDA
   42 CONTINUE
C
      IF(ABS(PF).GT.90.) THEN
         THN2=ROCKMIN
      ELSE
         THN2=ROCKMAX
      END IF
C
      THPI=PICONT(4)
      IF(THPI .LT. ROCKMIN) THPI=ROCKMIN
      IF(THPI .GT. ROCKMAX) THPI=ROCKMAX
      THETA=TH
      IF(THETA .LE. 0.) THETA=1.
      IF(THETA .GT. 90.) THETA=90.
      THL=-THEN1 + ATAN(COSD(PSIN1)*TAND(90.-THETA))*DPR
      IF(THL .LT. ROCKMIN) THL=ROCKMIN
      IF(THL .GT. ROCKMAX) THL=ROCKMAX
      THCA=AMIN1(THPI,THN2,THL)
C
C
      COMMIN=AMAX1(ROCKMIN,S2 LA2(2)+DELNZL)
      COMMAX=AMIN1(ROCKMAX,S2 LA2(2)+DELNZU)
      IF(DELNOZ .GT. .001)THEN
         COMN(2)=(AMIN1(COMMAX,AMAX1(S2 LA2(2)+DELNOZ,THCA)))*C1
     $          +THCA*(1.-C1)
         TEST=0.
      ELSE IF(DELNOZ .LT. -.001) THEN
         COMN(2)=AMAX1(COMMIN,AMIN1(S2 LA2(2)+DELNOZ,THCA))
         TEST=0.
      ELSE
         TEST=0.
         COMMAX=S2 LA2(2)+DELNZU
         COMMIN=S2 LA2(2)+DELNZL
         IF(COMERR(2) .LT. TEST .AND. WOSSE(2) .GT. 0.) COMMIN=S2 LA2(2)
         IF(COMEPR(2) .GT. TEST .AND. WOSSE(2) .LT. 0.) COMMAX=S2 LA2(2)
         COMN(2)=AMAX1(COMMIN,AMIN1(COMMAX,THCA))
      END IF
      COMN(4)=COMN(2)
C
C
*****
* ***REACTION JET THRUST LIMITER--MAX. (ACTUAL) THRUST AVAILABLE ***
*
LOCATION=072   SA    N=3   INPUTS=FOST(COMPJ=S)
*
*****
* *** FORT 060--TAIL CLEARANCE CALCULATIONS
*
LOCATION=060   FORT   INPUTS=SRPSE
      ADD VARIABLES=ALT
FORTRAN STATEMENTS
C
      ALT = -SRPSE(3)
C
      IF(ITCFLG.EQ.0) GOTO 75
      CGIX=SRPFFTZ(1)+SRPSE(1)-SRPTZ(1)+XCG*COSD(TH)-ZCGN*SIND(TH)
      CGIZ=SRPFFTZ(3)+SRPSE(3)-SRPTZ(3)-(XCG*SIND(TH)+ZCGN*COSD(TH))
      EMPANG=EMPTAN-GRATE*(TIME+TSTROKE)
      EMPX=EMPHYP*COSD(EMPANG)+EMPC3
      EMPZ=EMPHYP*SIND(EMPANG)-EMPC4
      EMPIX=-(EMPX*COSD(ATHETA)+EMPZ*SIND(ATHETA))+VAC*COSD(FFA)*TIME
      EMPIZ=-(EMPZ*COSD(ATHETA)-EMPX*SIND(ATHETA))-VAC*SIND(FFA)*TIME
      DIFFX=EMPIX-CGIX
```

```
     DIFFZ=EHFIZ-CGIZ
     DIFF=(DIFFX**2+DIFFZ**2)**.5
  75 CONTINUE
*
*****
* *** REACTION JET ACTUATORS ***
*
LOCATION=074    LA1    N=3         INPUTS=SA(S=S)
*
*****
* *** DUAL NOZZLE ACTUATORS ***
*
LOCATION=055    LA2    N=4    INPUTS=FOPT(COMN=S)

* *** MODIFY EASIEST VARIABLE NAMES TO BE COMPATIBLE
*     GGP PLOT FILE ***
*
LOCATION=045       FOPT    INPUTS=SRPSE,USTSE,WSTSE,ESTSE
                                    S2 LA1,COMN,S2 LA2
              ADD VARIABLES=SRPSE1,SRPSE2,USTSE1,USTSE2,USTSE3
                            WSTSE1,WSTSE2,WSTSE3,ESTSE1,ESTSE2,ESTSE3
                            S2 LA11,S2 LA12,S2 LA13,COMN1,COMN2,COMN3
                            COMN4,S2 LA21,S2 LA22,S2 LA23,S2 LA24
FORTRAN STATEMENTS
     SRPSE1=SRPSE(1)
     SRPSE2=SRPSE(2)
     USTSE1=USTSE(1)
     USTSE2=USTSE(2)
     USTSE3=USTSE(3)
     WSTSE1=WSTSE(1)
     WSTSE2=WSTSE(2)
     WSTSE3=WSTSE(3)
     ESTSE1=ESTSE(1)
     ESTSE2=ESTSE(2)
     ESTSE3=ESTSE(3)
     S2 LA11=S2 LA1(1)
     S2 LA12=S2 LA1(2)
     S2 LA13=S2 LA1(3)
     COMN1=COMN(1)
     COMN2=COMN(2)
     COMN3=COMN(3)
     COMN4=COMN(4)
     S2 LA21=S2 LA2(1)
     S2 LA22=S2 LA2(2)
     S2 LA23=S2 LA2(3)
     S2 LA24=S2 LA2(4)
*****
*
END OF MODEL
PRINT
```

What is claimed is:

1. A method for controlling acceleration of an escape device such as an ejection seat after said device has separated from the craft which carries the device, wherein said device includes a propulsion system for both accelerating and adjusting the angular orientation of said device after separation, the method comprising:

selecting a particular acceleration level for said device after separation, wherein the magnitude of said selected acceleration level is defined in terms of acceleration along each of three separate orthogonal axes;

estimating the acceleration level at which said propulsion system actually accelerates said device after separation, wherein said estimated acceleration level is calculated in terms of acceleration actually measured along each of said three separate orthogonal axes;

comparing said estimated acceleration level with said selected acceleration level;

generating an error signal when said estimated acceleration level does not substantially match said selected acceleration level; and adjusting the operation of said propulsion system in response to said error signal, wherein such adjustment includes adjusting propulsion system operation in an amount related to the value of said error signal, to cause said estimated acceleration level to substantially match said selected acceleration level.

2. The method of claim 1, wherein adjusting the operation of said propulsion system includes adjusting propulsion system operation in an amount proportionally related to the value of said error signal, and further, such adjustment includes adjusting said propulsion system operation in an amount related to the past values of said error signal which occur over a period of time during which said estimated acceleration level does not substantially match said selected acceleration level.

3. The method of claim 1, wherein said device's propulsion system includes means for rotating said device in various angular directions and at various angular rates after separation, and further including simultaneous adjustment to the angular orientation of said escape device at the same time acceleration of said device is controlled, by:

selecting a post-separation angular orientation of said device;

estimating the actual post-separation angular orientation of said device;

generating selected angular rates for said propulsion system to move said device from said estimated post-separation orientation into said selected orientation, and operating said propulsion system according to the values of said selected angular rates which are generated;

estimating the actual angular rates at which said device is rotating after separation;

generating an error signal when said selected angular rates do not substantially match said estimated angular rates; and adjusting the operation of said propulsion system in response to said error signal, wherein such adjustment includes adjusting propulsion system operation in an amount related to the value of said error signal, to cause said propulsion system to rotate said device at said selected angular rates so that said device is moved into said selected post-separation orientation.

4. The method of claim 3, wherein adjusting the operation of said propulsion system includes adjusting propulsion system operation in an amount proportionally related to the value of said error signal, and further, such adjustment includes adjusting propulsion system operation in an amount related to the past values of said error signal which occur over a period of time during which said estimated angular rates do not substantially match said required angular rates.

5. An escape device of a type used for ejecting from a craft, comprising:

an escape body for holding a person during ejection, said body having a propulsion system operable to control the trajectory and attitude of said body after separation of said body from said craft;

means for sensing acceleration of said body along a first, second and third orthogonal directional axis;

a microprocessor, operatively connected to said propulsion system and to said sensing means, said microprocessor being programmed to issue commands to said propulsion system for controlling the acceleration, trajectory and attitude of said body after separation, said microprocessor program including (a) means defining certain desired and actual acceleration levels of said body in terms of an acceleration radical ($a_{rad}$) pursuant to the following equation:

$$a_{rad} = \left[ \left( \frac{a_x}{a_{x,lim}} \right)^2 + \left( \frac{a_y}{a_{y,lim}} \right)^2 + \left( \frac{a_z}{a_{z,lim}} \right)^2 \right]$$

wherein:

$a_x$ = linear acceleration measured by said sensing means along said first orthogonal directional axis $a_x$ = linear acceleration measured by said sensing means along said second orthogonal directional axis $a_z$ = linear acceleration measured by said sensing means along said third orthogonal directional axis $a_{x,lim}$, $a_{y,lim}$, and $a_{z,lim}$ = predefined limits of acceleration along each of said three respective directional axes which can be sustained by an occupant of said device (b) means for selecting an acceleration radical within a certain range of predefined radicals, wherein said selected acceleration radical is indicative of a desired acceleration level for said body;

(c) means for calculating an actual acceleration radical including using said accelerations sensed by said sensing means to calculate said actual acceleration radical from the above equation, wherein said calculated radical is indicative of the actual acceleration of said body;

(d) means for comparing said selected acceleration radical with said calculated acceleration radical; and (e) means for adjusting said propulsion system operation when said calculated acceleration radical does not substantially match said selected acceleration radical, wherein said microprocessor program causes said microprocessor to control said propulsion system in a manner so as and to adjust said propulsion system in an amount related to present and past values of the difference between said calculated and selected acceleration radicals, to cause said actual acceleration radical to substantially match said selected acceleration radical.

6. The escape device of claim 5, wherein said escape body's propulsion system includes means for rotating said body in various angular directions and at various angular rates after separation of said body from said craft, and said microprocessor program further including means for simultaneous adjustment of the angular orientation of said body at the same time acceleration of said device is controlled, by:

selecting a post-separation angular orientation of said body;

estimating the actual angular orientation of said body;

generating selected angular rates for said propulsion system to move said body from said estimated post-separation orientation into said selected orientation, and operating said propulsion system according to the values of said selected angular rates which are generated;

estimating the actual angular rates at which said body is rotating after separation;

generating an error signal when said selected angular rates do not substantially match said estimated angular rates; and adjusting the operation of said propulsion system in response to said error signal, wherein said adjustment includes adjusting propulsion system operation in an amount related to the present and past values of said error signal, to cause said propulsion system to rotate said body at said selected angular rates so that said body is moved into said selected post-separation orientation.

* * * * *

UNITED STATES PATENT AND TRADEMARK OFFICE
CERTIFICATE OF CORRECTION

PATENT NO. : 4,846,421
DATED : July 11, 1989
INVENTOR(S) : Arun K. Trikha

It is certified that error appears in the above-identified patent and that said Letters Patent is hereby corrected as shown below:

Column 1, line 5, "of" should be -- by --.

Column 3, line 1, after "angles", delete -- of --.

Column 6, lines 34-39, "1/2" was omitted from the formula. It should read:

$$a_{rad} = \left[ \left(\frac{a_x}{a_{x,\,lim}}\right)^2 + \left(\frac{a_y}{a_{y,\,lim}}\right)^2 + \left(\frac{a_z}{a_{z,\,lim}}\right)^2 \right]^{1/2}$$

In claim 5, column 27, lines 54-59, "1/2" was omitted from the formula. It should read:

$$a_{rad} = \left[ \left(\frac{a_x}{a_{x,\,lim}}\right)^2 + \left(\frac{a_y}{a_{y,\,lim}}\right)^2 + \left(\frac{a_z}{a_{z,\,lim}}\right)^2 \right]^{1/2}$$

UNITED STATES PATENT AND TRADEMARK OFFICE
CERTIFICATE OF CORRECTION

PATENT NO. : 4,846,421

DATED : July 11, 1989

INVENTOR(S) : Arun K. Trikha

It is certified that error appears in the above-identified patent and that said Letters Patent is hereby corrected as shown below:

Claim 5, column 28, line 27, after "as", delete -- and --.

Signed and Sealed this

Twenty-first Day of August, 1990

*Attest:*

HARRY F. MANBECK, JR.

*Attesting Officer*   *Commissioner of Patents and Trademarks*